(12) United States Patent
Lin

(10) Patent No.: US 12,025,809 B1
(45) Date of Patent: Jul. 2, 2024

(54) DEVICE AND METHOD FOR AUTOMATICALLY ADJUSTING A DIOPTER

(71) Applicant: AAC Acoustic Technologies (Shanghai) Co., Ltd., Shanghai (CN)

(72) Inventor: Qinghua Lin, Shanghai (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 0 days.

(21) Appl. No.: 18/342,690

(22) Filed: Jun. 27, 2023

Related U.S. Application Data

(63) Continuation of application No. PCT/CN2023/092614, filed on May 6, 2023.

(30) Foreign Application Priority Data

Mar. 31, 2023 (CN) .......................... 202310348106.X

(51) Int. Cl.
  *G02B 27/01* (2006.01)
  *G02B 27/00* (2006.01)
  *G06F 3/01* (2006.01)

(52) U.S. Cl.
  CPC ..... *G02B 27/0176* (2013.01); *G02B 27/0093* (2013.01); *G06F 3/013* (2013.01); *G02B 2027/0178* (2013.01)

(58) Field of Classification Search
  CPC ............ G02B 27/0176; G02B 27/0093; G02B 2027/0178; G06F 3/013
  See application file for complete search history.

(56) References Cited

U.S. PATENT DOCUMENTS

| | | | | |
|---|---|---|---|---|
| 10,042,169 B2* | 8/2018 | Zhang | .................. | G02B 27/017 |
| 10,419,745 B2* | 9/2019 | Liu | ...................... | G02B 6/0016 |
| 11,092,772 B2* | 8/2021 | Zheng | ................ | G02B 27/0176 |
| 11,269,180 B2* | 3/2022 | Browy | ............... | G02B 27/0081 |
| 11,425,829 B2* | 8/2022 | Zheng | .................... | G02B 7/023 |
| 11,619,820 B2* | 4/2023 | Osterhout | ............... | G06F 3/017 |
| | | | | 359/630 |
| 11,662,575 B2* | 5/2023 | Browy | ............... | G02B 27/0172 |
| | | | | 359/368 |
| 2017/0285343 A1* | 10/2017 | Belenkii | ............... | H04N 13/344 |
| 2023/0045175 A1* | 2/2023 | Border | .................. | G06T 19/006 |
| 2023/0130723 A1* | 4/2023 | Osterhout | ............ | H04N 13/239 |
| | | | | 345/8 |

* cited by examiner

*Primary Examiner* — Vinh T Lam
(74) *Attorney, Agent, or Firm* — W&G Law Group

(57) ABSTRACT

Provided are a device and method for automatic diopter adjusting. The device and method are applied to VR glasses and achieve a desirable automatic VR diopter adjustment effect. The device includes: a barrel holder, a display module, a diopter adjusting lens assembly, at least two guide slots, an adjusting ring, a processor, a pupil image acquisition unit, and a transmission assembly. The pupil image acquisition unit acquires a pupil image displayed by the display module and transmits the pupil image to the processor. The processor determines whether diopter adjustment is needed, generates adjustment driving information, and drives the transmission assembly according to the adjustment driving information to work. The transmission assembly drives the adjusting ring to rotate, thereby driving the diopter adjusting lens assembly to rotate to adjust a distance between the diopter adjusting lens assembly and the display module, and realize adjustment on the diopter.

10 Claims, 5 Drawing Sheets

```
┌─────────────────────────────────────────────┐
│ Acquire, by the pupil image acquisition unit, a pupil │─ S1
│ image displayed by the display module and transmit the │
│ pupil image to the processor                │
└─────────────────────────────────────────────┘
                      │
┌─────────────────────────────────────────────┐
│ Receive, by the processor, the pupil image, determine │─ S2
│ whether diopter adjustment is needed, and convert the │
│ pupil image into adjustment driving information │
└─────────────────────────────────────────────┘
                      │
┌─────────────────────────────────────────────┐
│ Transmit, by the processor, the adjustment driving │─ S3
│ information to the transmission assembly    │
└─────────────────────────────────────────────┘
                      │
┌─────────────────────────────────────────────┐
│ Drive, by the transmission assembly according to the │
│ adjustment driving information, the adjusting ring to │─ S4
│ rotate, thereby driving the diopter adjusting lens │
│ assembly to rotate to adjust a distance between the │
│ diopter adjusting lens assembly and the display module │
└─────────────────────────────────────────────┘
                      │
┌─────────────────────────────────────────────┐
│ Control, by the processor when the pupil image │─ S5
│ outputted by the pupil image acquisition unit reaches a │
│ preset definition, the transmission assembly to stop │
└─────────────────────────────────────────────┘
```

FIG. 5

DEVICE AND METHOD FOR AUTOMATICALLY ADJUSTING A DIOPTER

TECHNICAL FIELD

The present disclosure relates to the technical field of smart wearable virtual reality (VR) devices, and in particular to a device and method for automatically adjusting a diopter.

BACKGROUND

With the progresses of network technologies, electronic information technologies, and games, various VR devices and augmented reality (AR) devices are developed. Higher sensory requirements are imposed on external devices by users. VR glasses, also referred to as a VR headset or a VR head-mounted display (HMD), give the user a feeling of being in a virtual environment by blocking external visual and auditory senses from the user.

Conventional VR glasses are designed for a fixed inter-pupillary distance (IPD). In order to meet normal use of different users with different IPDs, lenses of the VR glasses are often large.

The user must accurately wear the glasses to ensure definitions of pictures. When the user wears the glasses inaccurately and sees unclear pictures, the user needs to take off the smart wearable VR headset to adjust a diopter or rotate a toggle button to adjust the diopter. It is not convenience for the user to quickly adjust the smart wearable VR headset to a reasonable diopter, and affects experiences of the users.

Therefore, it is necessary to provide a novel device and method for automatically adjusting a diopter.

SUMMARY

Provided are a device and method for automatically adjusting a diopter. The device and method have a desirable automatic VR diopter adjustment effect, a high picture definition, a wide application range and a good user experience.

According to an aspect, a device automatically adjusting a diopter is provided. The device is applied to VR glasses and includes: a barrel holder, a display module provided at an image side of the barrel holder, a diopter adjusting lens assembly slidably provided in the barrel holder, at least two guide slots each penetrating through the barrel holder and extending spirally along a circumferential direction of the barrel holder, an adjusting ring sleeved on the barrel holder, a processor, a pupil image acquisition unit fixed to the barrel holder, and a transmission assembly fixed to an outer side of the barrel holder. An outer peripheral side of the diopter adjusting lens assembly is supported by the guide slots, extends to the adjusting ring and is limited by the adjusting ring by way of clamping.

The processor is electrically connected to the transmission assembly and the pupil image acquisition unit, the pupil image acquisition unit is configured to acquire a pupil image displayed by the display module and transmit the pupil image to the processor, the processor is configured to receive the pupil image, determine whether diopter adjustment is needed, generate adjustment driving information, and drive the transmission assembly according to the adjustment driving information to work.

The transmission assembly is in transmission connection with the adjusting ring, and configured to drive the adjusting ring to rotate, and the rotation of the adjusting ring drives the diopter adjusting lens assembly to rotate to adjust a distance between the diopter adjusting lens assembly and the display module and realize the diopter adjustment.

As an improvement, the diopter adjusting lens assembly includes a lens holder provided in the barrel holder, an optical lens fixed to an inner peripheral side of the lens holder, and engaging posts fixed to an outer peripheral side of the lens holder. The barrel holder includes a barrel holder body and a boss protruding and extending from one side of the barrel holder body. The engaging posts pass through the at least two guide slots and are limited by the adjusting ring.

As an improvement, the adjusting ring includes an adjusting ring body sleeved on the barrel holder, limiting grooves recessed from an inner side of the adjusting ring body along an optical-axis direction, and a first gear structure protruding and extending from an outer side of the adjusting ring body. The transmission assembly includes a drive unit fixed to one side of the barrel holder, an output shaft penetrating through the barrel holder and fixed with the drive unit, and a second gear structure fixed to the output shaft and engaged with the second gear structure.

As an improvement, a diameter of the first gear structure is greater than a diameter of the second gear structure.

As an improvement, a number of the limiting grooves is three, a number of the engaging posts is three, and a number of the at least two guide slots is three, the three limiting grooves are uniformly distributed at the inner side of the adjusting ring body, the three engaging posts are uniformly distributed at the outer peripheral side of the lens holder, and the three guide slots are uniformly distributed at a peripheral side of the barrel holder body. The three engaging posts respectively abut against the three limiting grooves through the three guide slots.

As an improvement, the barrel holder body is provided with a first mounting groove and a second mounting groove recessing from the barrel holder body toward a side away from the adjusting ring, a first sealing ring and a second sealing ring are respectively provided in the first mounting groove and the second mounting groove, and the adjusting ring abuts against the first sealing ring and the second sealing ring.

As an improvement, a protective cover is fixed to a side of the barrel holder away from the display module.

As an improvement, the display module includes a fixation assembly and a display fixed to a side of the fixation assembly close to the barrel holder. The barrel holder is fixed to the fixation assembly.

As an improvement, the fixation assembly includes an end cover, a support plate fixed to a side of the end cover close to the barrel holder, a printed circuit board (PCB) fixed to the support plate, and a light shielding sheet attached to the display. The PCB extends to the end cover.

According to another aspect, a method for automatically adjusting a diopter is provided. The method is applied to the device for automatically adjusting a diopter. The method includes the following steps:

S1: acquiring, by the pupil image acquisition unit, a pupil image displayed by the display module and transmitting the pupil image to the processor;

S2: receiving, by the processor, the pupil image, determining whether diopter adjustment is needed, and converting the pupil image into adjustment driving information;

S3: transmitting, by the processor, the adjustment driving information to the transmission assembly;

S4: driving, by the transmission assembly according to the adjustment driving information, the adjusting ring to rotate, where the rotation of the adjusting ring drives the diopter adjusting lens assembly to rotate to adjust a distance between the diopter adjusting lens assembly and the display module; and S5: controlling, by the processor when the pupil image outputted by the pupil image acquisition unit reaches a preset definition, the transmission assembly to stop.

According to the device and method for automatic adjusting of diopter provided by the present disclosure, a display module, a diopter adjusting lens assembly, guide slots and an adjusting ring are provided on a barrel holder. An outer peripheral side of the diopter adjusting lens assembly is supported by the guide slots, and extends to the adjusting ring and is limited by the adjusting ring by clamping. The pupil image acquisition unit is configured to acquire a pupil image displayed by the display module and transmit the pupil image to the processor. The processor is configured to receive the pupil image, determines whether diopter adjustment is required, generate adjustment driving information, and drive the transmission assembly according to the adjustment driving information to work. The transmission assembly is in transmission connection with the adjusting ring, and configured to drive the adjusting ring to rotate, thereby driving the diopter adjusting lens assembly to rotate to adjust a distance between the diopter adjusting lens assembly and the display module, and realize adjustment on the diopter. In the field of intelligent wearable VR devices, the method for automatic adjusting of diopter is suitable for all users. For short-sighted users, neither a distance of exit pupil nor a mask width is required to be increased. The transmission assembly drives the adjusting ring to rotate, thereby realizing the automatic adjustment on the diopter. The overall structure is compact and small, the mounting space is saved, and the device is light and thin. Meanwhile, an appropriate image definition can be provided for different users to improve the user experience.

BRIEF DESCRIPTION OF DRAWINGS

In order to more clearly illustrate the technical solutions in the embodiment of the present disclosure, the drawings used in the description of the embodiment will be briefly described below. It is obvious that the drawings in the following description are only some embodiments of the present disclosure. For those skilled in the art, other drawings can be obtained according to these drawings without creative efforts. In the drawings:

FIG. 5 is a flowchart of a method for automatically adjusting a diopter according to the present disclosure.

Reference signs: 100: device for automatically adjusting a diopter, 1: display module, 11: fixation assembly, 111: end cover, 112: support plate, 113: PCB, 114: light shielding sheet, 12: display, 2: barrel holder, 21: barrel holder body, 22: boss, 23: guide slot, 24: first mounting groove, 25: second mounting groove, 3: adjusting ring, 31: adjusting ring body, 32: limiting groove, 33: first gear structure, 4: transmission assembly, 41: output shaft, 42: second gear structure, 5: diopter adjusting lens assembly, 51: lens holder, 52: optical lens, 53: toggle post, 6: pupil image acquisition unit, 7: protective cover, 8: first sealing ring, and 9: second sealing ring.

DETAILED DESCRIPTION OF EMBODIMENTS

The technical solutions of the embodiments of the present disclosure are clearly and completely described below with reference to the drawings. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

Embodiment 1

Figure 1:
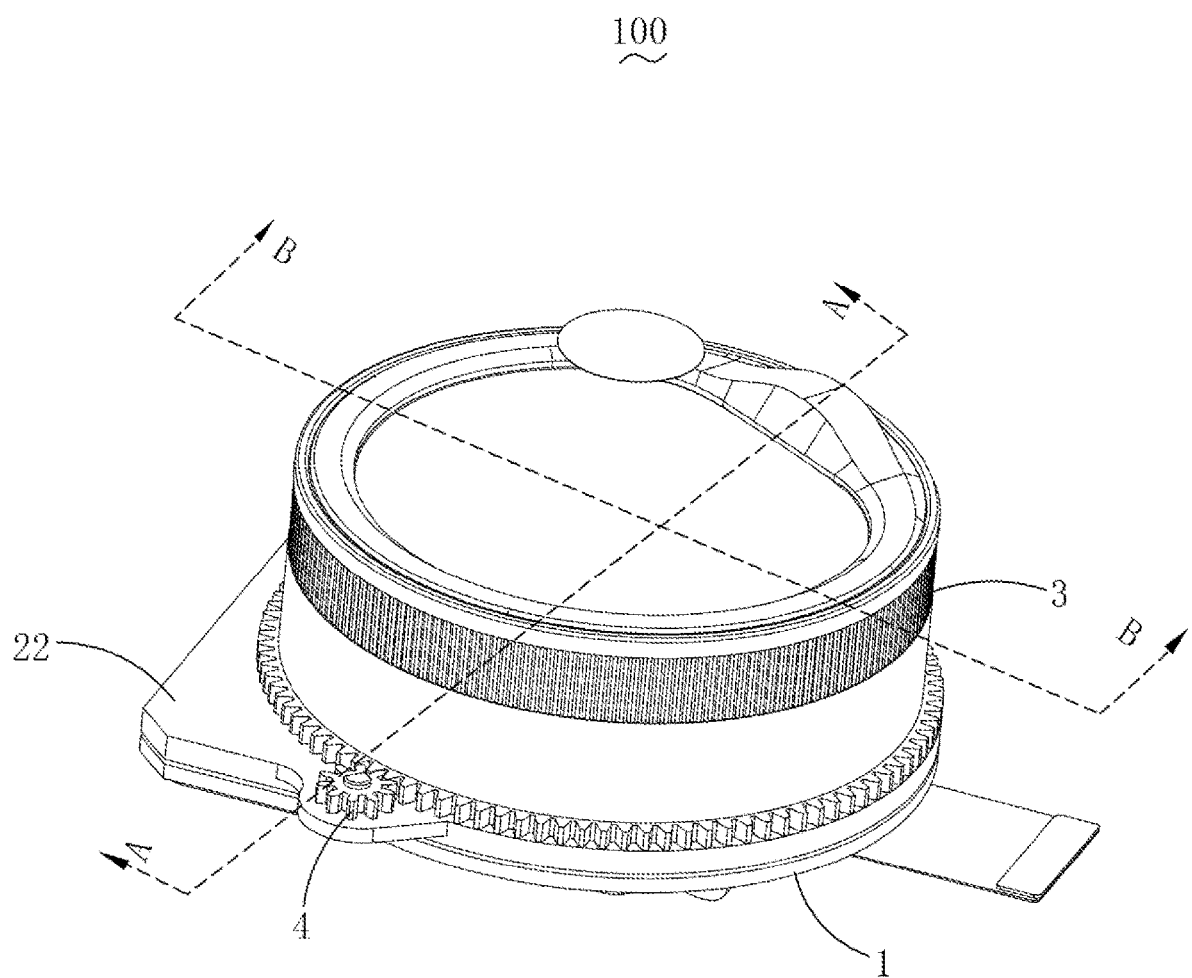
FIG. 1 is a schematic structural view of a device for automatically adjusting a diopter according to the present disclosure.
Figure 2:
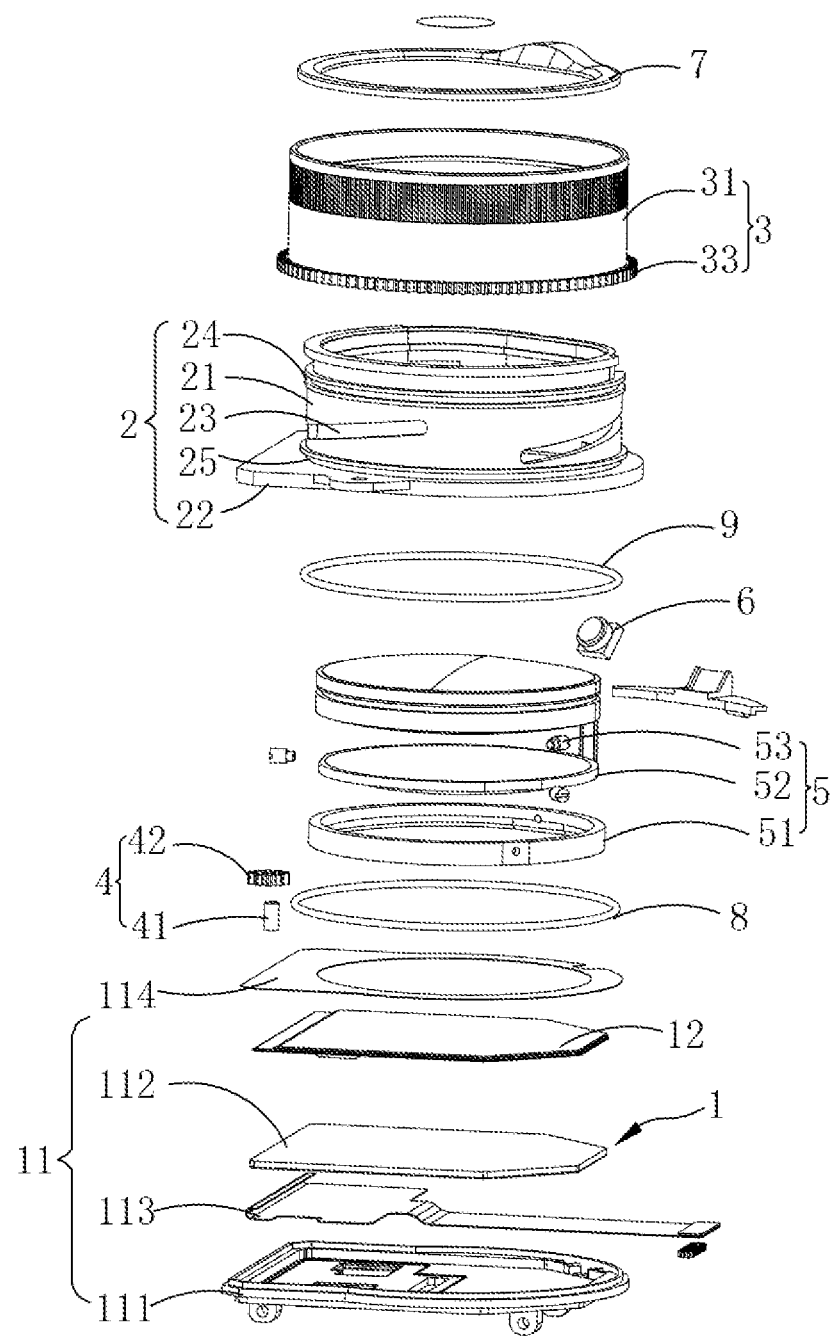
FIG. 2 is an exploded view of the device shown in FIG. 1.
Figure 3:
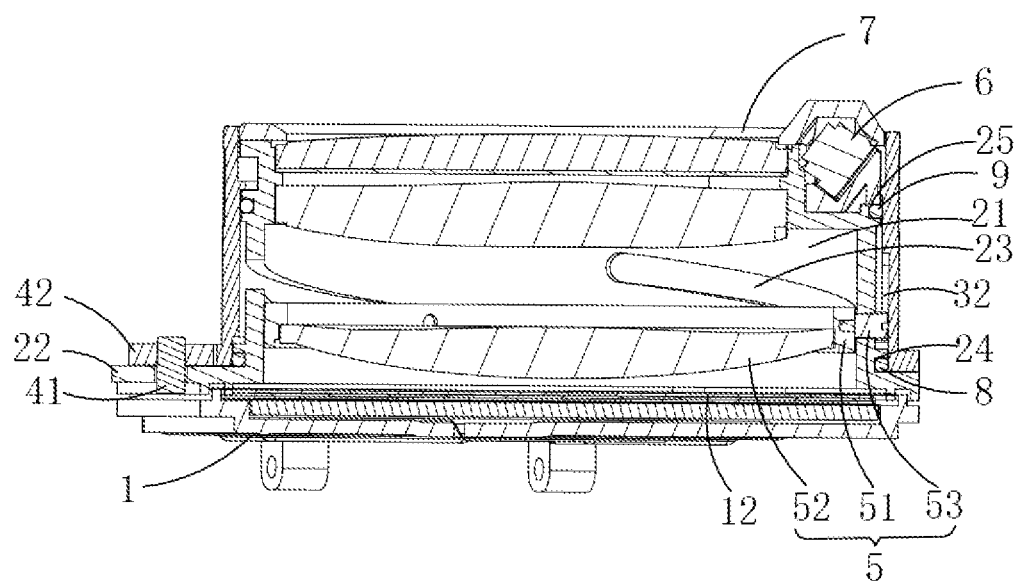
FIG. 3 is a cross-sectional view taken along line A-A shown in FIG. 1.
Figure 4:
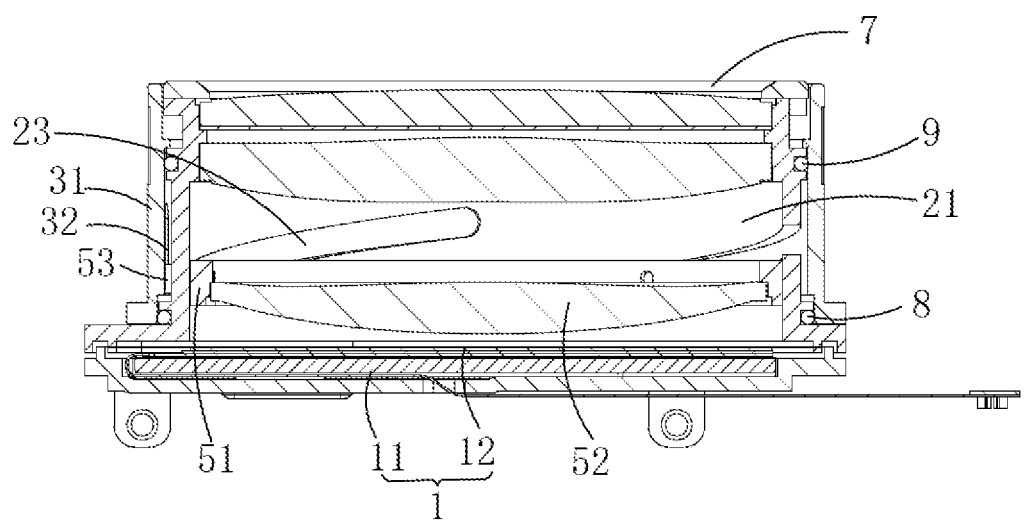
FIG. 4 is a cross-sectional view taken along line B-B shown in FIG. 1.

Referring to FIGS. 1-4, the present disclosure provides a device for automatically adjusting a diopter. The device 100 is applied to VR glasses and includes: a barrel holder 2, a display module 1 mounted at an image side of the barrel holder 2, a diopter adjusting lens assembly 5 slidably provided in the barrel holder 2, at least two guide slots 23 each penetrating through the barrel holder 2 and extending spirally along a circumferential direction of the barrel holder 2, and an adjusting ring 3 sleeved on the barrel holder 2. An outer peripheral side of the diopter adjusting lens assembly 5 is supported by the guide slots 23, extends to the adjusting ring 3 and is limited by the adjusting ring 3 by way of clamping.

In some embodiments, two guide slots 23 are formed symmetrically. The diopter adjusting lens assembly 5 is supported by the two guide slots 23, so the supporting force is uniform and the stability is high.

The device 100 further includes a processor (not shown in the figure), a pupil image acquisition unit 6 fixed to the barrel holder 2, and a transmission assembly 4 fixed to an outer side of the barrel holder 2. The processor is electrically connected to the transmission assembly 4 and the pupil image acquisition unit 2.

The pupil image acquisition unit 2 is configured to acquire a pupil image displayed by the display module 1 and transmit the pupil image to the processor.

The processor is configured to receive the pupil image, determine whether diopter adjustment is needed, generate adjustment driving information, and drive the transmission assembly 4 according to the adjustment driving information to work. When a user wears the VR glasses with the device 100, the pupil image acquisition unit 6 acquires the pupil image and transmits the pupil image to the processor. According to the image acquired by the pupil image acquisition unit 6, the processor computes whether diopter adjustment is needed and converts the pupil image into driving information.

The transmission assembly 4 is in transmission connection with the adjusting ring 3, and configured to drive the adjusting ring 3 to rotate, thereby driving the diopter adjusting lens assembly 5 to rotate to adjust a distance between the diopter adjusting lens assembly 5 and the display module 1, and realize adjustment on the diopter. In response to determining the VR glasses is worn in place, the pupil image acquisition unit 6 transmits a pupil image to the processor. The processor enables the transmission assembly 4, and the transmission assembly 4 drives the adjusting ring 3 to rotate. One side of the diopter adjusting lens assembly 5 penetrates through the barrel holder 2 and is limited to the adjusting ring 3. The rotation of the adjusting ring 3 pushes the diopter adjusting lens assembly 5 to move up and down in the barrel holder 2, so as to adjust a distance between the diopter adjusting lens assembly 5 and the display module 1, and realize automatic adjustment of the diopter. Therefore, in the field of smart wearable VR devices, the device for automatically adjusting a diopter is suitable for all users. For short-sighted users, neither a distance of exit pupil nor a mask width is required to be increased. The transmission assembly 4 drives the adjusting ring to rotate, thereby realizing the automatic adjustment on the diopter. The whole structure is compact and small, the mounting space is saved, and the device is light and thin. Meanwhile, an appropriate definition of the picture can further be provided for different users to improve the user experience.

In some embodiments, the diopter adjusting lens assembly 5 includes a lens holder 51 provided in the barrel holder 2, an optical lens 52 fixed to an inner peripheral side of the lens holder 51, and engaging posts fixed to an outer peripheral side of the lens holder 51. The barrel holder 2 includes a barrel holder body 21 and a boss 22 protruding and extending from one side of the barrel holder body 21. The engaging posts each pass through the guide slots 23 and are limited with the adjusting ring 3. Bottom ends of the guide slots 23 are close to the display module 1. With annular extension from the bottom end of the guide slot 23 to the top end of the guide slot 23, the toggle post 53 moves in the guide slot 23 conveniently to realize rotating and lifting functions.

The transmission assembly 4 drives the adjusting ring 3 to rotate. The adjusting ring 3 pushes the engaging posts 53 to move in the guide slots 23, thereby adjusting a distance between the optical lens 52 and the display module 1. The lens holder 51 is provided in the barrel holder 2. The transmission assembly 4 drives the adjusting ring 3 to rotate, thereby pushing the engaging posts 53 to move in the guide slots 23 of the barrel holder body 21 to change the distance between the diopter adjusting lens assembly 5 and the display module 1, and realize the automatic diopter adjustment.

In some embodiments, the adjusting ring 3 includes an adjusting ring body 31 sleeved on the barrel holder 2, limiting grooves 32 recessed from an inner side of the adjusting ring body 31 along an optical-axis direction, and a first gear structure 33 protruding and extending from an outer side of the adjusting ring body 31. The transmission assembly 4 includes a drive unit (not shown in the figure) fixed to one side of the barrel holder 2, an output shaft 41 penetrating through the barrel holder 2 and fixed with the drive unit, and a second gear structure 42 fixed to the output shaft 41. The first gear structure 33 is engaged with the second gear structure 42. The transmission assembly 4 receives driving information from the processor, and the drive unit of the transmission assembly 4 is started up according to the driving information. The drive unit drives the output shaft 41 to rotate, thereby driving the second gear structure 42 to rotate. Since the first gear structure 33 is engaged with the second gear structure 42, the adjusting ring 3 rotates in the driving process of the drive unit. The rotation of the adjusting ring 3 pushes the engaging posts 53 to move in the guide slots 23 of the barrel holder body 21, thereby move the lens holder 51 up and down, changing the distance between the diopter adjusting lens assembly 5 and the display module 1 and realizing the automatic adjustment of the diopter. For example, when the drive unit rotate in a forward direction, the adjusting ring 3 rotates in the counterclockwise direction, and the engaging posts 53 move in the counterclockwise direction along with the limiting grooves 32 at the inner side of the adjusting ring 3. The toggle post 53 moves from the bottom end of the guide slot 23 to the top end of the guide slot 23, and thus the distance between the optical lens 52 and the display module 1 is increased. For example, when the drive unit rotates in a reverse direction, the adjusting ring 3 rotates in a clockwise direction, and the toggle post 53 moves in the clockwise direction along with the limiting grooves 32 at the inner side of the adjusting ring 3. The toggle post 53 moves from the top end of the guide slot 23 to the bottom end of the guide slot 23, and thus the distance between the optical lens 52 and the display module 1 is decreased. With the forward rotation and reverse rotation of the drive unit, the distance between the diopter adjusting lens assembly 5 and the display module 1 can be adjusted automatically, and the automatic adjustment of the diopter is realized.

In some embodiments, the transmission assembly 4 may further be an electric machinery or a motor. The processor provides a driving signal for the motor. The motor causes rotation, thereby driving the second gear structure 42 to rotate. The second gear structure 42 drives the first gear structure 33 to move, thereby driving the adjusting ring 3 to rotate. The limiting grooves 32 of the adjusting ring 3 push the engaging posts 53 to move, thus lifting the lens holder 51 up and down to adjust the distance between the lens and the display module 1, and realize the automatic adjustment on the diopter.

In some embodiments, a diameter of the first gear structure 33 is greater than a diameter of the second gear structure 42. For the sake of convenience in installation and the desirable transmission effect, the first gear structure 33 and the second gear structure 42 are straight gears.

In some embodiments, there are three limiting grooves 32 that are uniformly distributed at the inner side of the adjusting ring body 31. There are three engaging posts that are uniformly distributed at the outer peripheral side of the lens holder 51. There are three guide slots 23 that are uniformly distributed at a peripheral side of the barrel holder body 21. The three engaging posts respectively abut against the three limiting grooves 32 through the three guide slots 23. The stability in movement is desirable.

In some embodiments, the barrel holder body 21 is recessed toward a side away from the adjusting ring 3 to form a first mounting groove 24 and a second mounting groove 25. A first sealing ring 8 and a second sealing ring 9 are respectively provided in the first mounting groove 24 and the second mounting groove 25. The adjusting ring 3 abuts against the first sealing ring 8 and the second sealing ring 9. Therefore, the adjusting ring 3 and the barrel holder 2 are sealed desirably with each other. In some embodiments, both the first sealing ring 8 and the second sealing ring 9 are an O-shaped sealing ring. The O-shaped sealing ring has excellent sealing performance.

In some embodiments, a protective cover 7 is fixed to a side of the barrel holder 2 away from the display module 1.

In some embodiments, the display module 1 includes a fixation assembly 11 and a display 12 fixed to a side of the fixation assembly 11 adjacent to the barrel holder 2. The barrel holder 2 is fixed to the fixation assembly 11. Therefore, the fixation between the fixation assembly 11 and the barrel holder 2 is desirable. In the rotation of the adjusting ring 3, the display 12 is stable, and the picture acquired by the pupil image acquisition unit 6 is clear.

In some embodiments, the fixation assembly 11 includes an end cover 111, a support plate 112 fixed to a side of the end cover 111 adjacent to the barrel holder 2, a PCB 113 fixed to the support plate 112, and a light shielding sheet 114 attached to the display 12. The PCB 113 extends to the end cover 111. The PCB 113, the display 12 and the light shielding sheet 114 are mounted and fixed by the support plate 112. All mounted components are assembled within the space surrounded by the end cover 111 for protection. The light shielding sheet 114 is configured to shield light for a better display effect of the display 12.

In some embodiments, the display 12 is a liquid crystal display (LCD). The LCD has a desirable display effect.

Embodiment 2

Referring to FIGS. 1-5, an embodiment of the present disclosure provides a method automatically adjusting a diopter. The method is applied to the device 100 for automatically adjusting a diopter in Embodiment 1. The method includes the following steps.

At S1: The pupil image acquisition unit 6 acquires a pupil image displayed by the display module 1 and transmits the pupil image to the processor.

At S2: The processor receives the pupil image, determines whether diopter adjustment is needed, and converts the pupil image into adjustment driving information. When a user wears the VR device including the device 100, the pupil image acquisition unit 6 transmits the acquired pupil image to the processor. According to the pupil image acquired by the pupil image acquisition unit 6, the processor determines whether diopter adjustment is needed and converts the pupil image into driving information.

At S3: The processor transmits the adjustment driving information to the transmission assembly 4.

At S4: According to the adjustment driving information, the transmission assembly 4 drives the adjusting ring to rotate, thereby driving the diopter adjusting lens assembly 5 to rotate to adjust a distance between the diopter adjusting lens assembly 5 and the display module 1. When the VR device is worn in place, the pupil image acquisition unit 6 transmits a pupil image to the processor. The processor enables the transmission assembly 4 and drives the transmission assembly 4 to rotate, and the rotation of the transmission assembly 4 drives the adjusting ring 3 to rotate. One side of the diopter adjusting lens assembly 5 penetrates through the barrel holder 2 and is limited with the adjusting ring 3. The rotation of the adjusting ring 3 pushes the diopter adjusting lens assembly 5 to move up and down in the barrel holder 2, so as to adjust a distance between the diopter adjusting lens assembly 5 and the display module 1, and realize automatic adjustment on the diopter.

At S5: When the pupil image outputted by the pupil image acquisition unit 6 reaches a preset definition, the processor controls the transmission assembly to stop. In the field of smart wearable VR devices, the method for automatically adjusting a diopter is suitable for all users. For short-sighted users, neither a distance of exit pupil nor a mask width is required to be increased, and thus the device is thin. Meanwhile, an appropriate image definition can be provided for different users to improve the user experience.

According to the device and method for automatic adjusting of diopter provided by the present disclosure, a display module, a diopter adjusting lens assembly, guide slots and an adjusting ring are provided on a barrel holder. An outer peripheral side of the diopter adjusting lens assembly is supported by the guide slots, and extends to the adjusting ring and is limited by the adjusting ring by clamping. The pupil image acquisition unit is configured to acquire a pupil image displayed by the display module and transmit the pupil image to the processor. The processor is configured to receive the pupil image, determines whether diopter adjustment is required, generate adjustment driving information, and drive the transmission assembly according to the adjustment driving information to work. The transmission assembly is in transmission connection with the adjusting ring, and configured to drive the adjusting ring to rotate, thereby driving the diopter adjusting lens assembly to rotate to adjust a distance between the diopter adjusting lens assembly and the display module, and realize adjustment on the diopter. In the field of intelligent wearable VR devices, the method for automatic adjusting of diopter is suitable for all users. For short-sighted users, neither a distance of exit pupil nor a mask width is required to be increased. The transmission assembly drives the adjusting ring to rotate, thereby realizing the automatic adjustment on the diopter. The overall structure is compact and small, the mounting space is saved, and the device is light and thin. Meanwhile, an appropriate image definition can be provided for different users to improve the user experience.

The above described are merely implementations of the present disclosure. It should be noted here that those of ordinary skill in the art may make improvements without departing from the concept of the present disclosure, but such improvements should fall within the protection scope of the present disclosure.

What is claimed is:

1. A device for automatically adjusting a diopter, applied to virtual reality (VR) glasses, and comprising: a barrel holder, a display module provided at an image side of the barrel holder, a diopter adjusting lens assembly slidably provided in the barrel holder, at least two guide slots each penetrating through the barrel holder and extending spirally along a circumferential direction of the barrel holder, an adjusting ring sleeved on the barrel holder, a processor, a pupil image acquisition unit fixed to the barrel holder, and a transmission assembly fixed to an outer side of the barrel holder, wherein an outer peripheral side of the diopter adjusting lens assembly is supported by the at least two guide slots, extends to the adjusting ring and is limited by the adjusting ring by way of clamping, the processor is electrically connected to the transmission assembly and the pupil image acquisition unit, the pupil image acquisition unit is configured to acquire a pupil image displayed by the display module and transmit the pupil image to the processor, the processor is configured to receive the pupil image, determine whether diopter adjustment is needed, generate adjustment driving information, and drive the transmission assembly according to the adjustment driving information to work, and the transmission assembly is in transmission connection with the adjusting ring, and configured to drive the adjusting ring to rotate, and the rotation of the adjusting ring drives the diopter adjusting lens assembly to rotate to adjust a distance between the diopter adjusting lens assembly and the display module and realize the diopter adjustment.

2. The device as described in claim 1, wherein the diopter adjusting lens assembly comprises a lens holder provided in the barrel holder, and an optical lens fixed to an inner peripheral side of the lens holder, and engaging posts fixed to an outer peripheral side of the lens holder, wherein the barrel holder comprises a barrel holder body and a boss protruding and extending from one side of the barrel holder body, and wherein the engaging posts pass through the at least two guide slots and are limited by the adjusting ring.

3. The device as described in claim 2, wherein the adjusting ring comprises an adjusting ring body sleeved on the barrel holder, limiting grooves recessed from an inner side of the adjusting ring body along an optical-axis direction, and a first gear structure protruding and extending from an outer side of the adjusting ring body, and wherein the transmission assembly comprises a drive unit fixed to one side of the barrel holder, an output shaft penetrating through the barrel holder and fixed with the drive unit, and a second gear structure fixed to the output shaft and engaged with the second gear structure.

4. The device as described in claim 3, wherein a diameter of the first gear structure is greater than a diameter of the second gear structure.

5. The device as described in claim 3, wherein a number of the limiting grooves is three, a number of the engaging posts is three, and a number of the at least two guide slots is three, the three limiting grooves are uniformly distributed at the inner side of the adjusting ring body, the three engaging posts are uniformly distributed at the outer peripheral side of the lens holder, and the three guide slots are uniformly distributed at a peripheral side of the barrel holder body, and wherein the three engaging posts respectively abut against the three limiting grooves through the three guide slots.

6. The device as described in claim 3, wherein the barrel holder body is provided with a first mounting groove and a second mounting groove recessing from the barrel holder body toward a side away from the adjusting ring, a first sealing ring and a second sealing ring are respectively provided in the first mounting groove and the second mounting groove, and the adjusting ring abuts against the first sealing ring and the second sealing ring.

7. The device as described in claim 1, wherein a protective cover is fixed to a side of the barrel holder away from the display module.

8. The device as described in claim 1, wherein the display module comprises a fixation assembly and a display fixed to a side of the fixation assembly close to the barrel holder, and the barrel holder is fixed to the fixation assembly.

9. The device as described in claim 8, wherein the fixation assembly comprises an end cover, a support plate fixed to a side of the end cover close to the barrel holder, a printed circuit board (PCB) fixed to the support plate, and a light shielding sheet attached to the display, and wherein the PCB extends to the end cover.

10. A method for automatically adjusting a diopter, applied to the device as described in claim 1, comprising:
   acquiring, by the pupil image acquisition unit, a pupil image displayed by the display module and transmitting the pupil image to the processor;
   receiving, by the processor, the pupil image, determining whether diopter adjustment is needed, and converting the pupil image into adjustment driving information;
   transmitting, by the processor, the adjustment driving information to the transmission assembly;
   driving, by the transmission assembly according to the adjustment driving information, the adjusting ring to rotate, where the rotation of the adjusting ring drives the diopter adjusting lens assembly to rotate to adjust a distance between the diopter adjusting lens assembly and the display module; and
   controlling, by the processor when the pupil image outputted by the pupil image acquisition unit reaches a preset definition, the transmission assembly to stop.

* * * * *